United States Patent
Kim et al.

(10) Patent No.: US 7,768,970 B2
(45) Date of Patent: Aug. 3, 2010

(54) METHOD AND APPARATUS FOR CONTROLLING IMAGE DATA IN A WIRELESS TERMINAL WITH NORMAL VIDEO COMMUNICATION MODE AND IMAGE MUTE MODE

(75) Inventors: Hwan Kim, Gumi-si (KR); Chae-Whan Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 11/369,882

(22) Filed: Mar. 8, 2006

(65) Prior Publication Data

US 2006/0276126 A1 Dec. 7, 2006

(30) Foreign Application Priority Data

Jun. 7, 2005 (KR) ...................... 10-2005-0048533

(51) Int. Cl.
*H03D 3/22* (2006.01)
(52) U.S. Cl. ................. 370/329; 455/403; 455/557; 455/552.1; 455/518; 370/352; 370/250; 370/349; 370/310; 370/466; 370/300; 370/385; 370/394; 370/450; 370/278; 370/392; 370/260; 709/203; 709/246
(58) Field of Classification Search ............. 455/466, 455/519, 3.06, 518, 414.1, 403, 41.2, 419, 455/412.1, 557, 552.1; 370/328, 331, 310.2, 370/311, 332, 498, 466, 467, 300, 385, 401, 370/414.4, 349, 250, 225, 352, 278, 392, 370/246; 709/231, 206; 348/E7.083
See application file for complete search history.

(56) References Cited

U.S. PATENT DOCUMENTS

| 6,212,547 | B1 |   | 4/2001 | Ludwig et al. |
| 6,339,760 | B1 | * | 1/2002 | Koda et al. ................. 704/278 |
| 6,437,818 | B1 | * | 8/2002 | Ludwig et al. ............ 348/14.09 |
| 6,741,554 | B2 | * | 5/2004 | D'Amico et al. ............ 370/225 |
| 7,035,290 | B1 | * | 4/2006 | Lyle ............................ 370/498 |
| 2002/0136166 | A1 | * | 9/2002 | Armbruster et al. ......... 370/250 |
| 2002/0142803 | A1 | * | 10/2002 | Yamamoto ................. 455/557 |
| 2003/0055722 | A1 | * | 3/2003 | Perreault et al. ............. 705/14 |
| 2003/0058486 | A1 |   | 3/2003 | Ogawa et al. |
| 2003/0092421 | A1 | * | 5/2003 | Dolwin ...................... 455/403 |
| 2004/0032853 | A1 | * | 2/2004 | D'Amico et al. ............ 370/349 |
| 2005/0036509 | A1 | * | 2/2005 | Acharya et al. ............. 370/466 |

(Continued)

FOREIGN PATENT DOCUMENTS

| KR | 2003-52456 | 6/2003 |
| KR | 2004-35522 | 4/2004 |

*Primary Examiner*—Rafael Pérez Gutiérrez
*Assistant Examiner*—Joseph Arevalo
(74) *Attorney, Agent, or Firm*—Roylance, Abrams, Berdo & Goodman, L.L.P.

(57) ABSTRACT

A method and apparatus for controlling video data in a wireless terminal having a normal video communication mode and a video mute mode is provided. The wireless terminal can be switched to the video mute mode if a user selects the video mute mode during normal video communication mode, thereby enabling video data preselected by the user to be presented on the terminal's display and transmitted to a distant party. The terminal can also display and transmit preselected video data if no video data is received from a distant party within a given time.

13 Claims, 2 Drawing Sheets

U.S. PATENT DOCUMENTS

Figure 1:
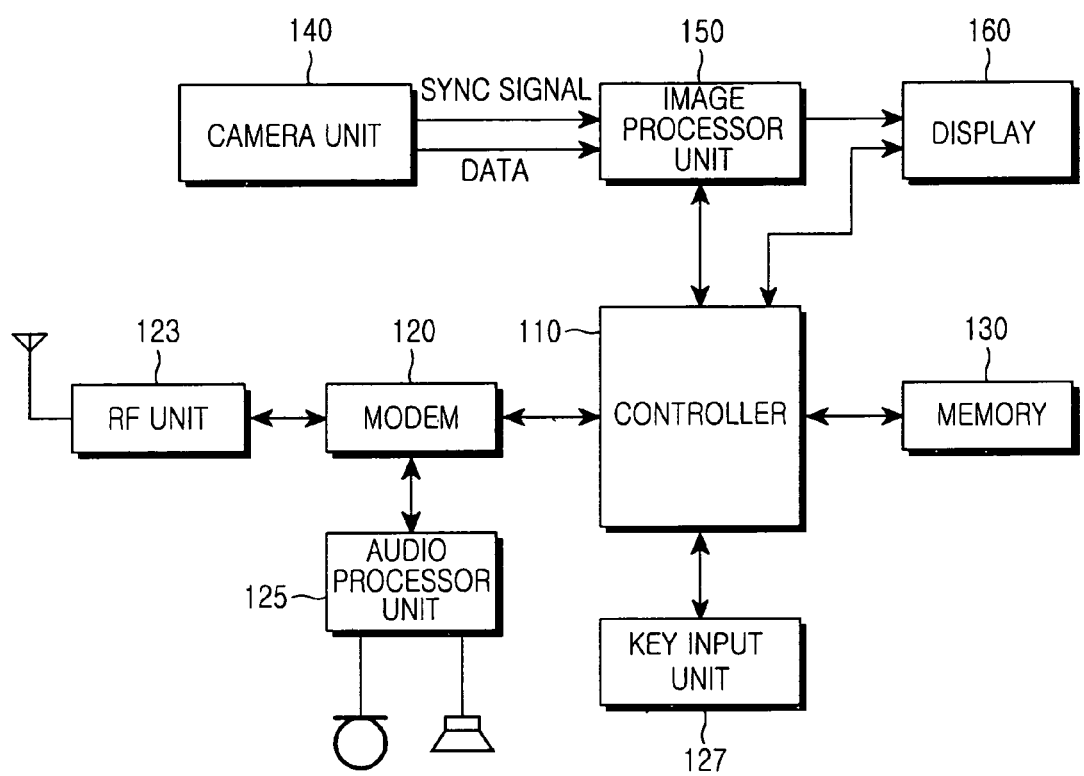

| | | | |
|---|---|---|---|
| 2005/0057699 A1* | 3/2005 | Bowser | 348/734 |
| 2005/0058088 A1* | 3/2005 | Decker et al. | 370/260 |
| 2005/0073574 A1 | 4/2005 | Krisbergh et al. | |
| 2005/0095981 A1* | 5/2005 | Benco | 455/3.06 |
| 2005/0246742 A1* | 11/2005 | Benco et al. | 725/62 |
| 2006/0099988 A1* | 5/2006 | Velagaleti et al. | 455/552.1 |
| 2006/0293073 A1* | 12/2006 | Rengaraju et al. | 455/518 |
| 2007/0091832 A1* | 4/2007 | Lee | 370/310 |
| 2007/0097958 A1* | 5/2007 | Lappalainen | 370/352 |
| 2007/0105579 A1* | 5/2007 | Shaffer et al. | 455/519 |
| 2007/0287477 A1* | 12/2007 | Tran | 455/466 |

* cited by examiner

METHOD AND APPARATUS FOR CONTROLLING IMAGE DATA IN A WIRELESS TERMINAL WITH NORMAL VIDEO COMMUNICATION MODE AND IMAGE MUTE MODE

This application claims the benefit under 35 U.S.C. §119 (a) of Korean Patent Application No. 2005-48533, filed Jun. 7, 2005, in the Korean Intellectual Property Office, the entire contents of which are hereby incorporated by reference.

BACKGROUND OF THE INVENTION

1. Field of the Invention

The present invention relates to a method and apparatus for controlling video data in a wireless terminal. More particularly, the present invention relates to a method and apparatus for controlling video data in a wireless terminal provided with a display for presenting video data, wherein the wireless terminal may be operated in normal video communication mode for transmitting a user's real time video data to a distant party, and video mute mode for blocking transmission of the user's real time video data.

2. Description of the Related Art

Traditional wireless mobile phones have been developed to have a structure to enable high-speed data transmission in addition to conventional voice communication. In particular, the mobile communications network according to the International Mobile Telecommunications-2000 (IMT-2000) specification may facilitate high-speed data communication in addition to voice communication with the wireless mobile terminal. The data transmitted through the wireless terminal in data communication may include packet data and video data. The wireless terminal may have also been provided with a camera and TV receiver to add a video display function, so that the terminal may display or transmit the moving or still pictures taken by the camera, and display received TV signals.

Thus, wireless terminals having video communication function enable users to transmit and receive video data together with audio data. In such wireless terminals, if the user switches the terminal to the video mute mode while engaged in the normal video communication mode, both transmission and reception of real time video data are blocked so that both the user's display and the distant party's display present no video data.

SUMMARY OF THE INVENTION

Accordingly, it is an object of exemplary embodiments of the present invention to provide a method and apparatus for controlling video data in a wireless terminal, which enables the terminal to present preselected video data on the display and transmit the video data to the distant party when the user switches the terminal to the video mute mode during normal video communication mode.

It is another object of exemplary embodiments of the present invention to provide a method and apparatus for controlling video data in a wireless terminal, which enables the terminal to present preselected video data on the display if there is no video data received for a given time while engaged in normal video communication mode.

According to an aspect of the present invention, a method and apparatus are provided for controlling video data in a wireless terminal during normal video communication mode and video mute mode. The wireless terminal can be switched to the video mute mode if a user selects the video mute mode during normal video communication mode, and enabling video data preselected by the user to be presented on the display and transmitted to the distant party while the terminal is in the video mute mode.

According to another aspect of the present invention, a method and apparatus for controlling video data in the wireless terminal with the normal video communication mode and the video mute mode are provided. The wireless terminal can be switched to a video mute mode if a user selects the video mute mode during normal video communication mode. The terminal can determine the video data preselected by the user to be displayed in the video mute mode, and display and transmit to a distant party video data representing the video mute mode or the user's video data according to the preselected video data.

According to another aspect of the present invention, a method and apparatus for controlling video data in the wireless terminal with the normal video communication mode and the video mute mode are provided. The terminal can determine whether there is video data received from a distant party during normal video communication mode, and can present video data preselected by the user on the display if there is no video data received from the distant party for a given time.

According to a further aspect of the present invention, a method and apparatus for controlling video data in a wireless terminal in normal video communication mode and video mute mode are provided. The terminal can determine whether there is video data received from a distant party during normal video communication mode, and can present video data preselected by the user on the display if there is no video data received from the distant party for a given time. The terminal can present received video data on the display if the video data is received from a distant party for the given time, and present the preselected video data on the display while transmitting it to the distant party if the video mute mode is selected during receipt of video data from the distant party.

BRIEF DESCRIPTION OF THE ATTACHED DRAWINGS

Figure 2:
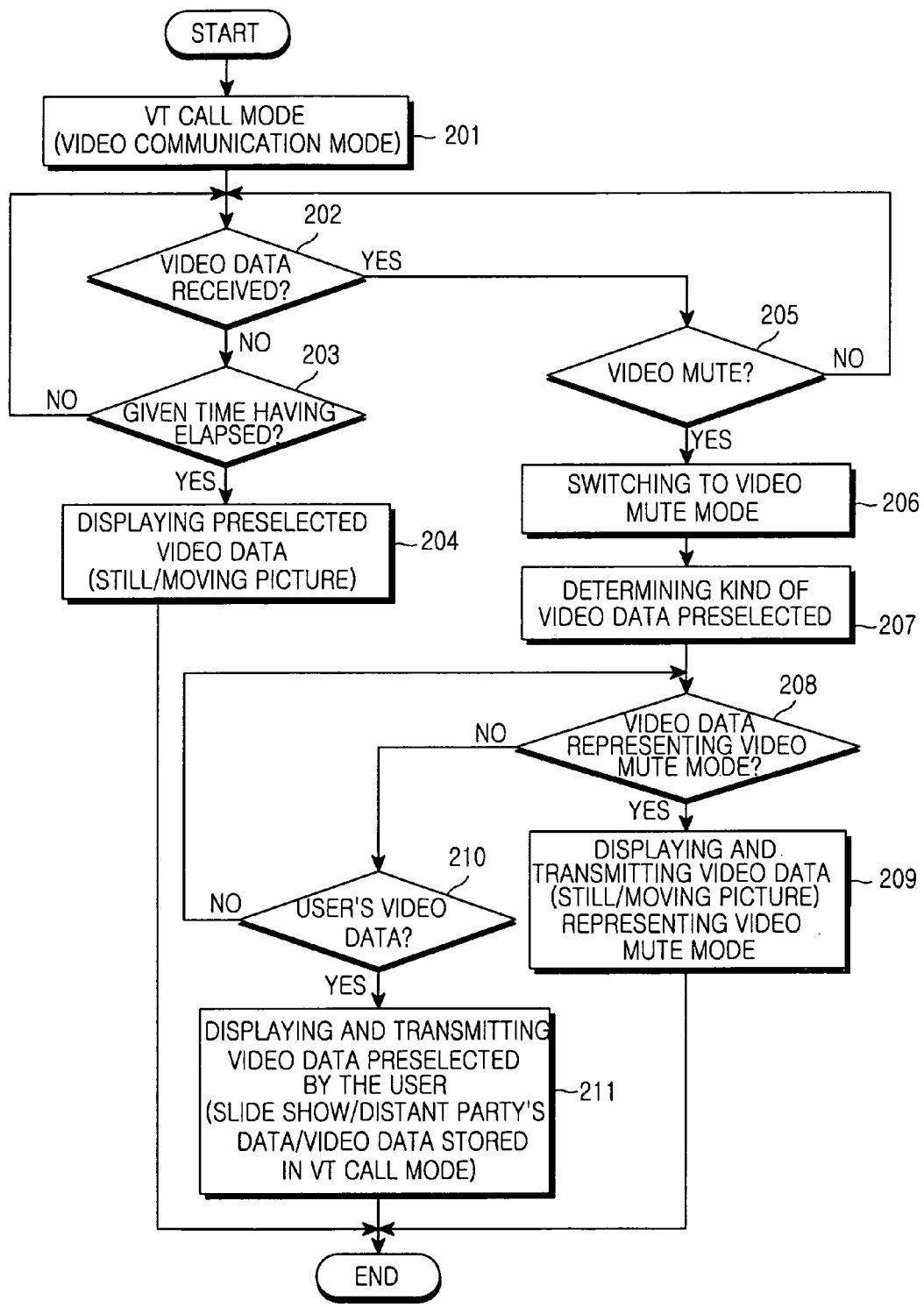

The above aspects and features of the present invention will be more apparent by describing certain exemplary embodiments of the present invention with reference to the accompanying drawings, in which:

FIG. 1 is a block diagram for illustrating the functional structure of a wireless terminal according to an exemplary embodiment of the present invention; and FIG. 2 is a flow chart for illustrating a method, according to an exemplary embodiment of the present invention, for presenting preselected video data on the display and transmitting it to the distant party during the video communication mode in, for example, a wireless terminal as shown in FIG. 1.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Referring to FIG. 1, a radio frequency (RF) module 123 for wireless communication comprises an RF transmitter for modulating and amplifying the frequency of a transmitted signal and an RF receiver for demodulating and low-noise amplification of a received signal. A modem 120 transforms digital signals from a controller 110 into corresponding analog signals for delivery to the RF module 123, or analog signals from the RF unit 123 into corresponding digital signals for delivery to an audio processor unit 125 or the controller 110. The audio processor unit 125 comprises a data codec for processing packet data and an audio codec for processing audio signals such as voice signals. The audio processor unit 125 converts digital audio signals from the modem 120 into corresponding analog signals for delivery to a speaker, or analog audio signals from a microphone into corresponding digital signals for delivery to the modem 120. The audio processor unit 125 may be a separate unit or a built-in element of the controller 110.

A memory unit 130 comprises program memory and data memory. The program memory can store programs for controlling the general operation of the wireless terminal comprising programs for controlling the display and transmission of preselected video data when there is no video data received from a distant party for a given time or when the wireless terminal is switched to the video mute mode while in normal video communication mode. Meanwhile, the data memory serves to temporarily store the data generated during execution of the programs. In addition, the memory unit 130 can store a still image or moving picture to represent the video mute mode. The memory unit 130 can store the vide data generated during normal video communication mode, a slide show, and other various still or moving pictures.

The controller 110 controls the functionality of the wireless terminal, and may be designed so as to comprise the modem 120 and the audio processor unit 125. Further, the controller 110 controls the wireless terminal to display preselected video data when there is no video data received for a given time during normal video communication mode, or to both present video data on the display and to transmit video data to a distant party if the user selects the video mute mode during normal video communication mode.

Also provided is a camera unit 140 which comprises a camera sensor for converting the optical signals of a captured image into corresponding electrical signals, and a signal processor for converting the analog electrical signals from the camera sensor into corresponding digital data. The camera sensor may be a CCD sensor, and the signal processor a Digital Signal Processor (DSP). The camera sensor and signal processor may be integrally combined or separately formed.

An image processor unit 150 processes the images from the camera unit 140 by frames so as to generate frame video data fitting the characteristics and size of a display 160. The image processor unit 150 comprises a video codec to compress the frame video data or decompress the compressed frame video data according to a prescribed process. The video codec may be, for example, JPEG, MPEG4, Wavelet, among others. The image processor unit 150 may be provided with an On Screen Display (OSD) function to generate OSD data according to the screen size under the control of the controller 110.

The display 160 displays both the images from the image processor unit 150 and the user's data transferred from the controller 160. The display 160 may comprise a liquid crystal display (LCD) unit, LCD controller, and memory for storing the video data. The LCD unit may be formed with a touch screen mode to serve as an input unit. The display 160 can also display preselected video data when there is no video data received or the terminal is switched to the video mute mode during normal video communication mode. A key input unit 127 comprises keys for inputting information on numbers and characters and keys for setting various functions.

Hereinafter will be described the inventive method of controlling the display and transmission of preselected video data during the normal video communication mode, in connection with FIGS. 1 and 2.

The wireless terminal first enters step 201 to perform normal video communication or telephone call mode (VT call mode). The controller 110 then detects the video data received from a distant party or caller in step 202. When a given time has lapsed in step 203 without detection of video data from the distant party, the controller 110 proceeds to step 204 to display the video data preselected by the user. The preselected video data may be at least one of various still or moving pictures such as a slide show, video data designed to represent termination of video reception, and the distant party's video data received prior to entry of video mute mode that have been stored in the memory unit 130.

Alternatively, when video data is received from the distant party in step 202, the controller 110 executes normal video communication mode, presenting the received video data on the display 160.

Meanwhile, if the user selects in step 205 the video mute mode during normal video communication mode, the controller switches the terminal to video mute mode in step 206. Subsequently, the controller 110 determines the kind of video data preselected by the user to be displayed in the video mute mode in step 207.

If the kind of preselected video data is representative of the video mute mode, step 208, the controller 110 controls in step 209 the display 160 to present the preselected video data, transmitting it to the distant party. The preselected video data may be at least one of the still or moving pictures stored in the memory unit 130 that can be selected by the user prior to or simultaneously with the switch to video mute mode.

Alternatively, if the kind of preselected video data is the user's video data, step 210, the controller 110 controls the display 160 to present the user's video data, transmitting it to the distant party, step 211. The user's video data may be at least one of the still or moving pictures stored in the memory unit 130 that can be selected by the user prior to or simultaneously with the switching to the video mute mode.

Thus, exemplary implementations of the present invention allow a wireless terminal to display and transmit video data preselected by the user when there is no video data received from the distant party for a given time or the user switches the terminal to a video mute mode.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A method for controlling video data on a wireless terminal, the method comprising:
    determining if a video mute mode is selected on the wireless terminal when the wireless terminal is in a normal video communication mode;
    switching the wireless terminal to the video mute mode from the normal video communication mode if the video mute mode is selected; and presenting pre-selected video data on a display of the wireless terminal and transmitting the pre-selected video data to a remote terminal when the wireless terminal is in the video mute mode, wherein the wireless terminal transmits real time video data to the remote terminal during the normal video communication mode and blocks transmission of real time video data to the remote terminal when the wireless terminal is in the video mute mode.

2. A method as defined in claim 1, wherein said pre-selected video data comprises video mute mode data.

3. A method as defined in claim 2, wherein the pre-selected video data comprises at least one of a still picture and a moving picture.

4. A method as defined in claim 2, wherein the pre-selected video data comprises at least one of a slide show, a still picture and a moving picture stored in said wireless terminal.

5. A method for controlling video data on a wireless terminal, the method comprising:

determining if a video mute mode is selected on the wireless terminal when the wireless terminal is in a normal video communication mode;

switching the wireless terminal to the video mute mode from a normal video communication mode if the video mute mode is selected;

determining a kind of video data to be displayed in the video mute mode; and presenting on a display of the wireless terminal and transmitting video data to a remote terminal comprising video mute mode data according to the kind of video data, wherein the wireless terminal transmits real time video data to the remote terminal during the normal video communication mode and blocks transmission of real time video data to the remote terminal when the wireless terminal is in the video mute mode.

6. A method as defined in claim 5, wherein the video mute mode data comprises at least one of a still picture and a moving picture.

7. A method as defined in claim 5, wherein the video data comprises at least one of a slide show, a still picture, a moving picture stored in said wireless terminal, and video data stored during the normal video communication mode.

8. A method for controlling a first video on a wireless terminal, the method comprising:

determining whether real time video is received in a wireless terminal when the wireless terminal is in a normal video communication mode;

switching the wireless terminal to a video mute mode from the normal video communication mode if no real time video is received for a specified time period;

presenting the first video on the display of the wireless terminal if the wireless terminal is in a video mute mode; and transmitting the first video to a remote terminal when the wireless terminal is in the video mute mode, wherein the wireless terminal transmits real time video to the remote terminal during the normal video communication mode and blocks transmission of real time video data to the remote terminal when the wireless terminal is in the video mute mode.

9. A method as defined in claim 8, wherein said first video comprises at least one of a slide show, a still or moving picture stored in said wireless terminal, video data stored during the normal video communication mode, and a still or moving picture for representing no video data received.

10. A method of controlling a first video comprising:

determining whether real time video is received in a wireless terminal when the wireless terminal is in a normal video communication mode;

switching the wireless terminal to a video mute mode from the normal video communication mode if no video is received for a specified time period;

presenting the first video data on a display of the wireless terminal if the wireless terminal is in a video mute mode; and transmitting the first video to a remote terminal when the wireless terminal is in the video mute mode;

if the real time video is received within said time period, presenting the received real time video on said display; and presenting, on said display, and transmitting the first video if the video mute mode is selected during receipt of the real time video.

11. A method as defined in claim 10, wherein the first video comprises at least one of a slide show, a still or moving picture stored in said wireless terminal, video data stored during the normal video communication mode, and a still or moving picture for representing no video data received.

12. A method as defined in claim 10, wherein the first video presented on said display and transmitted in the video mute mode comprises video mute mode data stored in said wireless terminal.

13. A wireless terminal, comprising:

a display; and a controller controlling display of video data on the display, wherein the wireless terminal enters a normal video communication mode, for transmitting real-time video to a remote terminal, and a video mute mode, for blocking the real-time data transmission to the remote terminal, when the video mute mode is selected, and wherein the display presents pre-selected video data when the wireless terminal is in the video mute mode.

* * * * *